(12) United States Patent
Kritzinger et al.

(10) Patent No.: US 10,949,760 B1
(45) Date of Patent: Mar. 16, 2021

(54) SYSTEMS AND METHODS FOR ADAPTATION OF SCORM PACKAGES AT RUNTIME WITH AN EXTENDED LMS

(71) Applicant: KnowBe4, Inc., Clearwater, FL (US)

(72) Inventors: Carl Kritzinger, Sedgefield (ZA);
Francisco Barreto, São Paulo (BR);
Mark William Patton, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/006,328

(22) Filed: Aug. 28, 2020

(51) Int. Cl.
| | |
|---|---|
| G06F 16/00 | (2019.01) |
| G06N 5/04 | (2006.01) |
| G06N 20/00 | (2019.01) |
| G06F 9/54 | (2006.01) |
| G06F 16/21 | (2019.01) |
| G06F 16/9035 | (2019.01) |

(52) U.S. Cl.
CPC ............... *G06N 5/04* (2013.01); *G06F 9/541* (2013.01); *G06F 16/212* (2019.01); *G06F 16/9035* (2019.01); *G06N 20/00* (2019.01)

(58) Field of Classification Search
CPC .................................................. G06F 16/212
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |

(Continued)

FOREIGN PATENT DOCUMENTS

WO    WO-2016/164844 A1    10/2016

*Primary Examiner* — Ajith Jacob
(74) *Attorney, Agent, or Firm* — Foley & Lardner LLP

(57) ABSTRACT

Systems and methods are described for tailoring shareable content object reference model (SCORM)-compliant content to one or more users. A learning management system (LMS), configured to be SCORM-compliant, initiates shareable content object (SCO) to provide content to users. The LMS implements an instance of application programming interface (API) comprising a plurality of functions to be called by SCO during runtime to access data model elements accessible via LMS. The LMS is configured to support one or more data model elements undefined by SCORM. Further, LMS receives a call to a function of the plurality of functions of the API from SCO to access information about users. The call references a name of a data model element undefined by SCORM. The data model element identifies information about users. The LMS provides information about the users to SCO and the SCO tailors the content to the users based on the information.

20 Claims, 9 Drawing Sheets

(56) References Cited

U.S. PATENT DOCUMENTS

| | | |
|---|---|---|
| 9,876,753 B1 | 1/2018 | Hawthorn |
| 9,912,687 B1 | 3/2018 | Wescoe et al. |
| 10,243,904 B1 | 3/2019 | Wescoe et al. |
| 2008/0254434 A1* | 10/2008 | Calvert .................... G09B 7/00 434/350 |
| 2008/0301150 A1* | 12/2008 | Carman ................ G06F 16/954 |
| 2016/0164898 A1 | 6/2016 | Belani et al. |
| 2016/0301705 A1 | 10/2016 | Higbee et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |

\* cited by examiner

Phishing Simulation Training!

Hi [ *Username* ] ⟵ 406

This is an automated security awareness & training exercise designed to help you protect yourself in future email use — *verify it, don't just click that link!*

*Oh no!* You clicked a "bad" link in a fake email (a "phish" that didn't go where it was supposed to, or submitted information on a fake login form)!

Always "hover" or mouse-over any link, to make sure it goes to exactly the same location as it says, and that it's the right destination — watch out for even slight differences! Plus, search/Google them yourself to be sure.

Common features of phishing emails to watch for:
- they often have a sense of urgency to them,
- they try to trick you into clicking an incorrect link
- they often contain misspellings or bad grammar
- they often threaten to disable your account or block an activity To report a phish, forward the email to [ *Email ID* ] ⟵ 408 and watch out for fake or "phishing emails" and links in the future. Thank you!

*Organization Logo* ⟵ 402

*Customizable Text* ⟵ 404

FIG. 4

SYSTEMS AND METHODS FOR ADAPTATION OF SCORM PACKAGES AT RUNTIME WITH AN EXTENDED LMS

TECHNICAL FIELD

The present invention generally relates to systems and methods for adapting shareable content object reference model (SCORM)-compliant content to make the SCORM-compliant content more relevant and appropriate to an individual user or a set of users.

BACKGROUND

Organizations have recognized phishing attacks as one of the most prominent threats that can cause serious breaches of data including confidential information such as intellectual property, financial information, organizational information and other important information. Attackers who launch phishing attacks may attempt to evade an organization's security apparatuses and tools, and target its employees. To prevent or to reduce the success rate of phishing attacks on employees, organizations may conduct security awareness training programs for their employees, along with other security measures. Through security awareness training programs, organizations actively educate their employees on how to spot and report a suspected phishing attack. As a part of a security awareness training program, an organization may execute a simulated phishing campaign for its employees to test and develop the cybersecurity awareness of the employees. In an example, the organization may execute the simulated phishing campaign by sending out one or more simulated phishing communications periodically or occasionally to devices of employees and observe responses of the employees to such simulated phishing communications. A simulated phishing communication may mimic a real phishing message and appear genuine to entice an employee to respond/interact with the simulated phishing communication. The simulated phishing communication may serve a twin purpose of training an employee to recognize phishing attacks and to gauge the security awareness of the employee based on an interaction of the employee with the simulated phishing communication (for example, by clicking on a link in the simulated phishing communication or opening an attachment in the simulated phishing communication) for further security awareness training. In response to the employee interacting with the simulated phishing communication, training content relevant to a phishing exploit included in the simulated phishing communication is launched. The training content may be provided through a learning management system (LMS).

Typically, organizations use an LMS as a key component for security awareness training programs. An LMS is an application or software that delivers and manages delivery of educational content including security awareness training content to employees (also referred to as users) of organizations. In an example, the LMS may receive the training content from a variety of sources, in units called shareable content objects (SCOs). There are several technical standards available for creating and/or integrating the training content into the LMS. An example of one such technical standard includes shareable content object reference model (SCORM). In an example, integration of the training content into the LMS may be controlled using technical guidelines outlined by SCORM.

According to the SCORM run-time environment (RTE), communication between an LMS and a SCO may occur through a European Computer Manufacturers Association ECMAScript (JavaScript) application programming interface (API). The LMS may initiate the launch of the SCO and implement the API. The SCO may find and use the API to communicate with the LMS. In an example, the SCO may make JavaScript calls to the API as a user (for example, an employee of an organization) interacts with SCORM-compliant training content during runtime. The SCORM-compliant training content delivered by the LMS is presented to each user in an identical style. In other words, a single variant of SCORM-compliant training content is presented to multiple employees. A uniform or single variant of SCORM-compliant training content may appear uninteresting and monotonous to users and thus less effective in conveying security awareness content. Accordingly, it is less likely that SCORM-compliant training content would be apposite to each individual user. The users may attempt to complete the training for the purpose of meeting mandatory training requirements. To make the SCORM-compliant training content more apposite for an individual user or a set of users, multiple variants of the SCORM-compliant training content may have to be created. This involves adding or modifying the SCOs, which may be time-consuming. Additionally, creating multiple variants of the SCORM-compliant training content may add significant overhead as each variant of the SCORM-compliant training content may be of a large size (for example, thousands of megabytes) which makes them expensive to manage, upload and store.

SUMMARY

Systems and methods are described for adapting shareable content object reference model (SCORM)-compliant content to make the SCORM-compliant content more relevant and appropriate to an individual user or a set of users.

Systems and methods are provided for tailoring shareable content object reference model (SCORM)-compliant content to one or more users. In an example embodiment, a method for tailoring SCORM-compliant content to one or more users, is described, which includes initiating, by a learning management system (LMS) configured to be SCORM-compliant, a shareable content object (SCO) to provide content to one or more users. The LMS stores data about the one or more users with respect to the content. The method further includes the LMS implementing an instance of an application programming interface (API) including a plurality of functions to be called by the SCO during runtime to access data model elements accessible via the LMS. The LMS may be configured to support one or more data model elements undefined by SCORM. The method also includes the LMS receiving a call to a function of the plurality of functions of the API from the SCO to access information about the one or more users. The call references a name of a data model element undefined by SCORM. Further, the data model element identifies the information about the one or more users. The method includes the LMS providing information about the one or more users identified by the data model element to the SCO. The SCO tailors the content to the one or more users based on the information.

In some implementations, the method further includes the LMS providing the content unmodified to the SCO.

In some implementations, the method further includes the LMS ignoring an error code with respect to the data model element being undefined by SCORM.

In some implementations, the method further includes receiving the call to the function comprising a GetValue function with a parameter passed to the GetValue function that identifies the data model element undefined by SCORM but supported by the LMS.

In some implementations, the method further includes receiving the call to the function requesting theme information for the one or more users.

In some implementations, the method further includes the LMS providing the theme information to use to tailor the content to the one or more users.

In some implementations, the SCO is configured to apply the theme information in rendering the content for the one or more users.

In some implementations, the method further includes the LMS providing the information in a serialized format.

In some implementations, the method further includes receiving the call to the function requesting information about progress of training via the content for the one or more users.

In some implementations, the method further includes the LMS providing information about which modules of the content for training the one or more users has taken to enable the SCO to remove corresponding portions of the content when rendering the content to the one or more users.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4 shows an illustration of a SCORM-compliant content that is to be tailored for one or more users of an organization, according to some embodiments;

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for adapting shareable content object reference model (SCORM)-compliant content to make the SCORM-compliant content more relevant and appropriate to an individual user or a set of users.

A. Computing and Network Environment

Figure 1A:
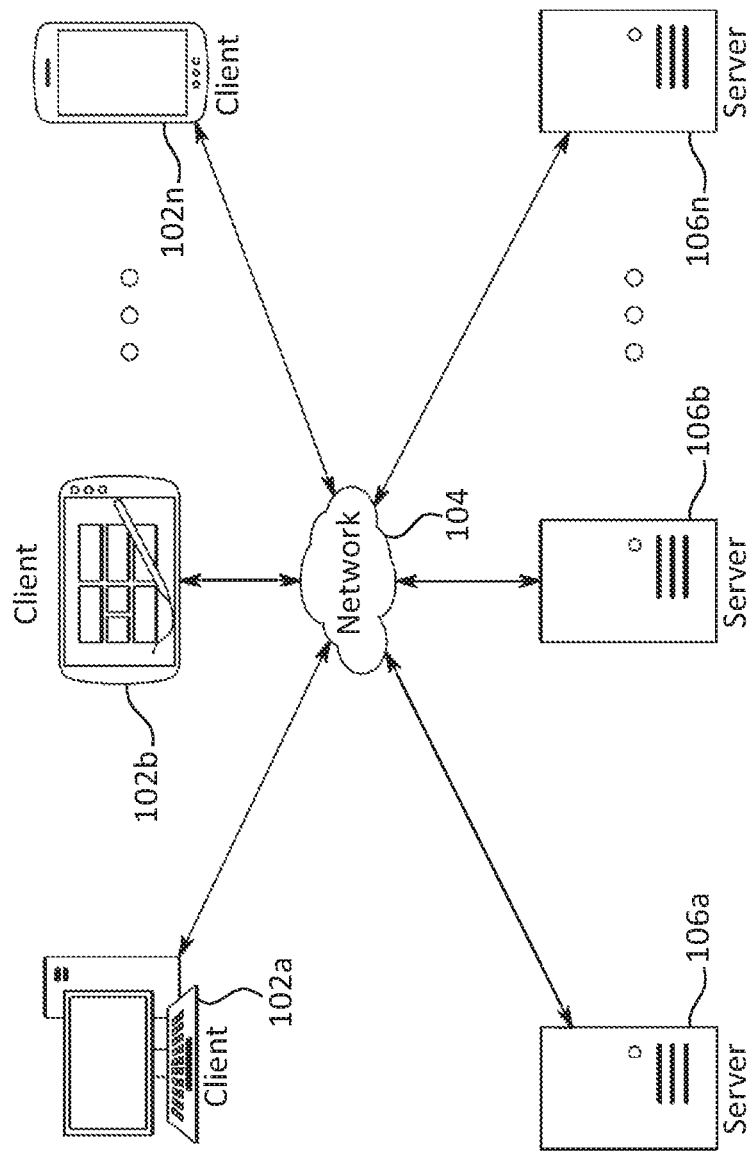
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
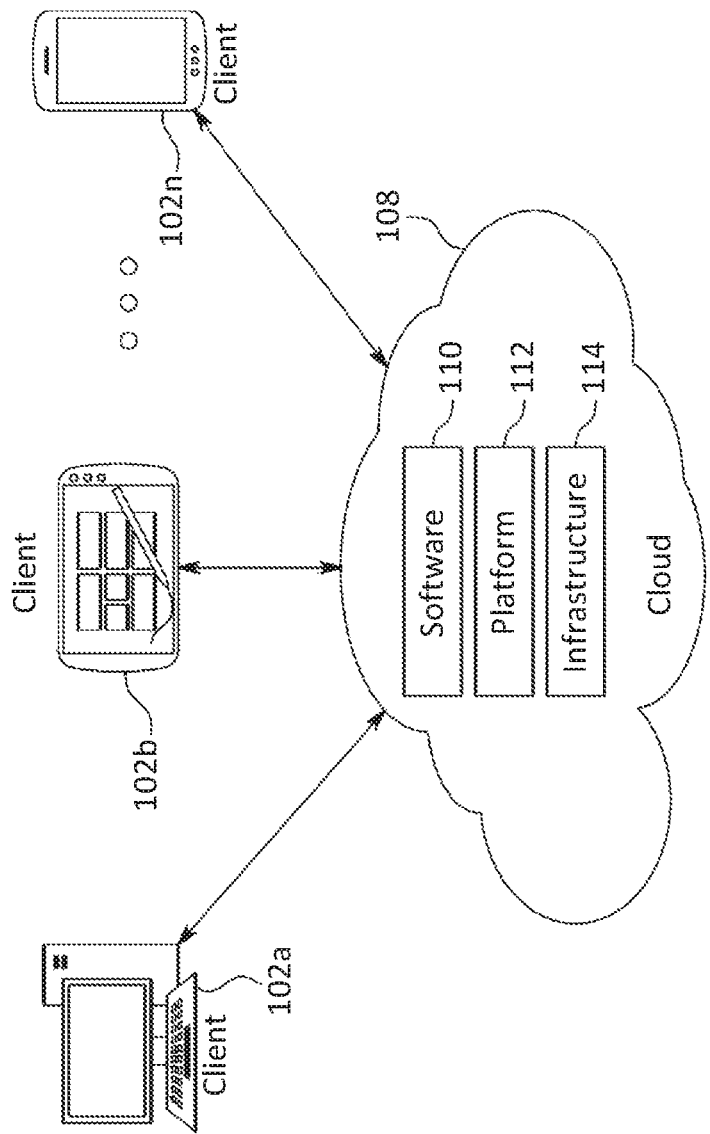
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
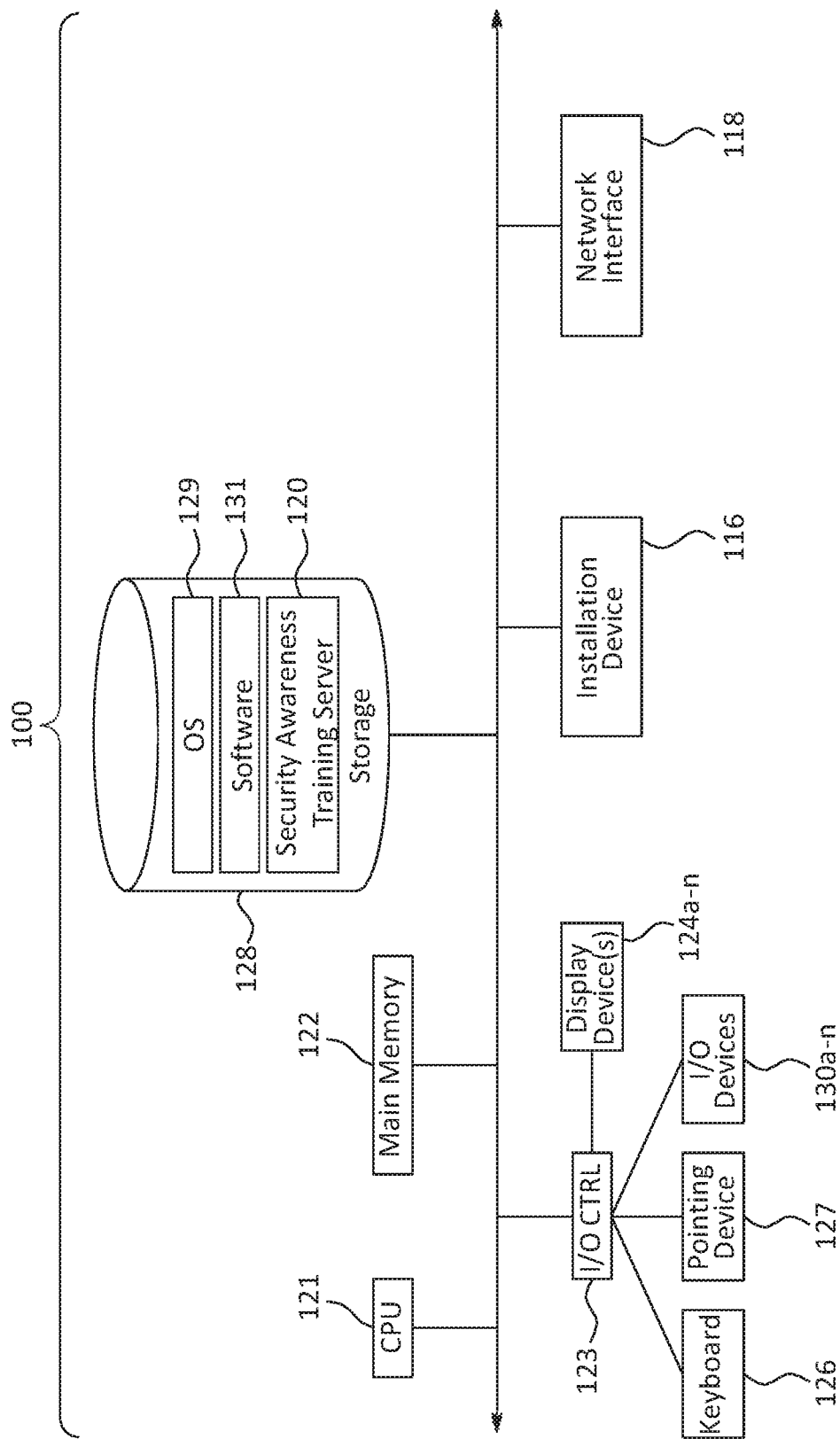
FIGS. 1C and 1D are block diagrams depicting embodiments of computing devices useful in connection with the methods and systems described herein, according to some embodiments.
Figure 1D:
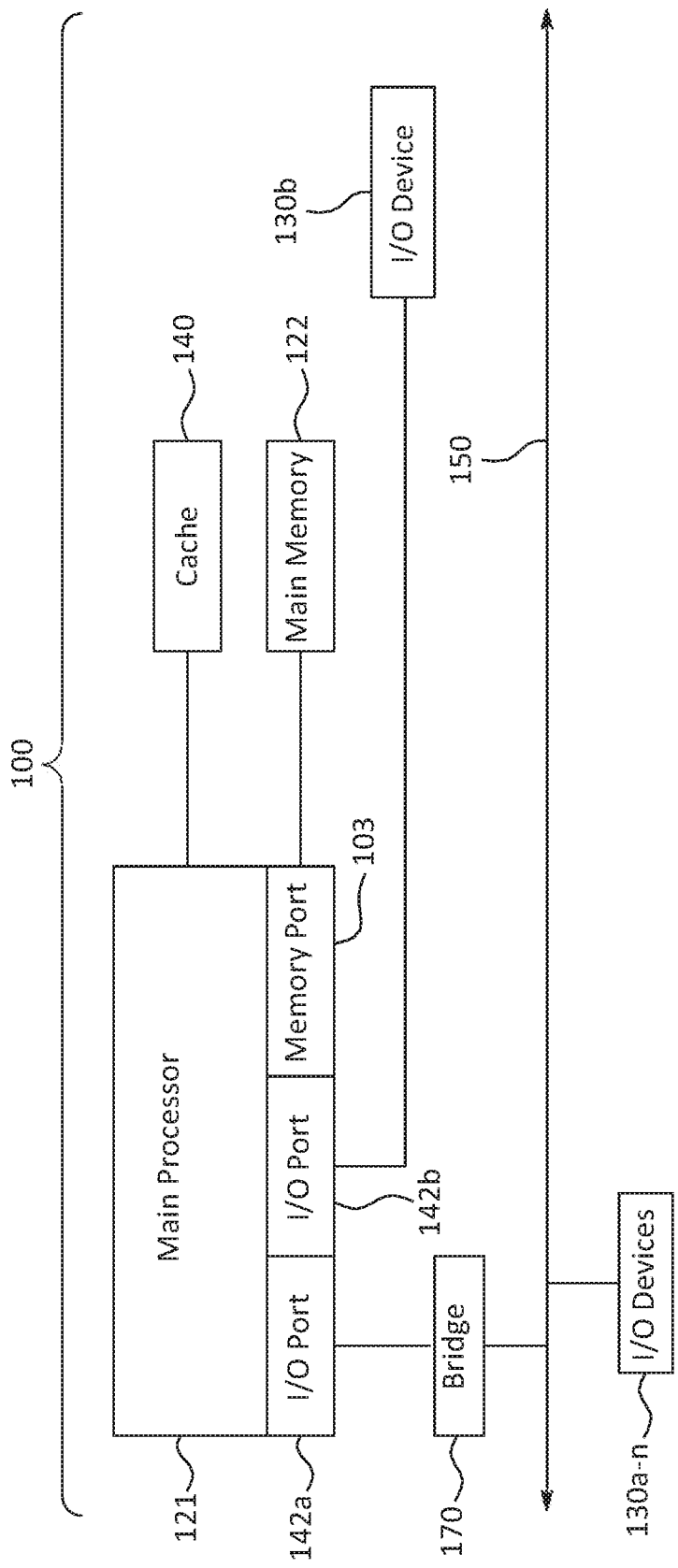

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness training server 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple iPhone. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provide for voice recognition and inputs, including, e.g., Microsoft KINECT, SIRI for iPhone by Apple, Google Now or Google Voice Search, and Alexa by Amazon.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, computing device 100 may include or connect to multiple display devices 124*a*-124*n*, which each may be of the same or different type and/or form. As such, any of I/O devices 130*a*-130*n* and/or the I/O controller 123 may include any type and/or form of suitable hardware, software, or combination of hardware and software to support, enable or provide for the connection and use of multiple display devices 124*a*-124*n* by computing device 100. For example, computing device 100 may include any type and/or form of video adapter, video card, driver, and/or library to interface, communicate, connect or otherwise use display devices 124*a*-124*n*. In one embodiment, a video adapter may include multiple connectors to interface to multiple display devices 124*a*-124*n*. In other embodiments, computing device 100 may include multiple video adapters, with each video adapter connected to one or more of display devices 124*a*-124*n*. In some embodiments, any portion of the operating system of computing device 100 may be configured for using multiple displays 124*a*-124*n*. In other embodiments, one or more of the display devices 124*a*-124*n* may be provided by one or more other computing devices 100*a* or 100*b* connected to computing device 100, via network 104. In some embodiments, software may be designed and constructed to use another computer's display device as second display device 124*a* for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness training server 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, N.Y.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Adaptation of SCORM Packages at Runtime with an Extended LMS.

The following describes systems and methods for adapting shareable content object reference model (SCORM)-compliant content to make the SCORM-compliant content more relevant and appropriate to an individual user or a set of users.

The systems and methods of the present disclosure leverage a security awareness training server including learning management system (LMS) that is SCORM compliant and additionally extended to handle proprietary extensions or parameters beyond the SCORM standard. The extended LMS (interchangeably referred to as an LMS) may enable modification of SCORM-compliant content (or training content or SCORM packages) at runtime by making provisions for application programming interface (API) calls that include specific undefined parameters (undefined by SCORM). In an example, SCORM-compliant content refers to content that is created and launched using specifications and standards defined by SCORM. Further, in an example, the SCORM-compliant content may be adapted, modified, or tailored to make the SCORM-compliant content more relevant and appropriate to an individual user or a set of users of an organization. A user may be an individual who is to be tested and trained by the security awareness training server. Further, the user may be an employee of an organization, a member of a group, or any individual that can receive an electronic message, or who may act in any capacity of the security awareness training server.

Examples of SCORM-compliant content tailoring include adding logos, adjusting the palette of the presentation of SCORM-compliant content to align with an organization's branding (or other local norms), tailoring for users in a specific department, tailoring for an affiliate organization or other corporate entity, removing a section of SCORM-compliant content that a user has viewed recently during another training session, removing a section of SCORM-compliant content that a user has already completed, modifying SCORM-compliant content to be relevant to the user or a group of users in terms of the language the SCORM-compliant content is presented in, and modifying according to the seniority of role and job function of the user or the group of users.

In an implementation, proprietary techniques may be used within the LMS that are not available within or otherwise compliant with the SCORM standard. This ensures that the SCORM-compliant content is rendered in an unmodified form. In an example, the LMS may have access to details of an account and a training course (for example, a part of the SCORM-compliant content) that a user may be running. The LMS may tailor the training course according to the user. As a consequence, only one training course needs to be created and there is a fine-grained control over presentation of the SCORM-compliant content to a specific user or a set of users. This significantly decreases the time needed to author SCORM-compliant content suitable for diverse audiences, increases the relevance of the training content for individual users and reduces overall system cost by reducing overheads in storage transmission and content cataloguing.

Figure 2:
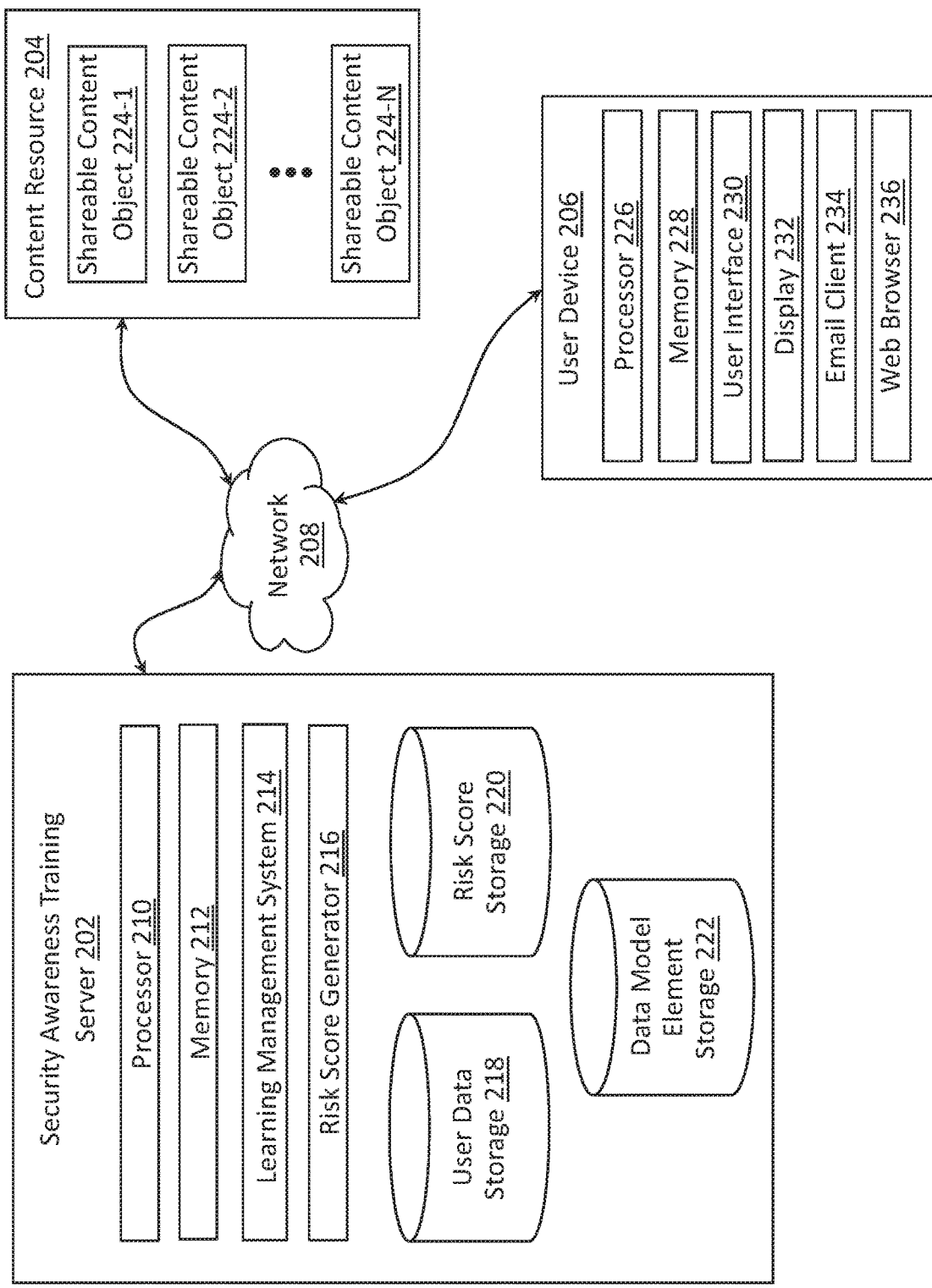
FIG. 2 depicts an implementation of some of an architecture of an implementation of a system for tailoring shareable content object reference model (SCORM)-compliant content to one or more users, according to some embodiments.

FIG. 2 depicts an implementation of some of an architecture of an implementation of system 200 for tailoring shareable content object reference model (SCORM)-compliant content to one or more users, according to some embodiments.

System 200 may include security awareness training server 202, content resource 204, user device 206, and network 208 enabling communication between the system components for information exchange. Network 208 may be an example or instance of network 104, details of which are provided with reference to FIG. 1A and its accompanying description.

According to an embodiment, security awareness training server 202 may be implemented in a variety of computing systems, such as a mainframe computer, a server, a network server, a laptop computer, a desktop computer, a notebook, a workstation, and any other computing platform. In an implementation, security awareness training server 202 may be communicatively coupled with content resource 204 and user device 206 through network 208 for exchanging information. In an implementation, security awareness training server 202 may be implemented in a server, such as server 106 shown in FIG. 1A. In some implementations, security awareness training server 202 may be implemented by a device, such as computing device 100 shown in FIGS. 1C and 1D. In some embodiments, security awareness training server 202 may be implemented as a part of a cluster of servers. In some embodiments, security awareness training server 202 may be implemented across a plurality of servers, thereby tasks performed by security awareness training server 202 may be performed by the plurality of servers. These tasks may be allocated among the cluster of servers by an application, a service, a daemon, a routine, or other executable logic for task allocation.

In one or more embodiments, security awareness training server 202 may facilitate cybersecurity awareness training in general and also via simulated phishing attacks. For example, the cybersecurity awareness training may be provided by security awareness training server 202 as a part of a training requirement periodically such as quarterly or half-yearly. The cybersecurity awareness training may also be provided dynamically by security awareness training server 202 through simulated phishing attacks. In some examples, the cybersecurity awareness training may be provided through quizzes, tests, training videos, assessments, text and image media, and any other method of training. A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat that resembles a real phishing threat. In response to a user interaction with the simulated phishing attack, for example if the user clicks on a link (i.e., a simulated phishing link), security awareness training server 202 may provide a security awareness training to the user. Security awareness training server 202 may be owned or managed or otherwise associated with an organization or any entity authorized thereof. In an implementation, security awareness training server 202 may be managed by a system administrator. The system administrator may be a professional managing organizational cybersecurity aspects. The system administrator may oversee and manage security awareness training server 202 to ensure cybersecurity goals of the organization are met. In an embodiment, the system administrator may be assigned login credentials to access security awareness training server 202.

In an example, security awareness training server 202 may be a Computer Based Security Awareness Training (CBSAT) system that performs security services such as performing simulated phishing attacks on a user or a set of users of an organization as a part of security awareness training. In some embodiments, the user may be an employee of the organization, a customer, a vendor, or anyone affiliated with the organization. In some embodiments, the user may be an end-customer/consumer or a patron using goods and/or services of the organization. In an example, security awareness training server 202 may provide the security awareness training to users for advertisement-based threats, email-based threats, newsletter-based threats, and other phishing threats. In some implementations, security awareness training server 202 may use artificial intelligence (AI), and machine learning (ML) to intuitively analyze security awareness requirements of a user based on risk scores, responses to phishing communications and tests associated with cybersecurity training. Based on the analysis, security awareness training server 202 may generate a phishing campaign for the user. Security awareness training server 202 may reduce work burden and support the system administrator in achieving the security goals of the organization.

According to some embodiments, security awareness training server 202 may include processor 210 and memory 212. For example, processor 210 and memory 212 of security awareness training server 202 may be CPU 121 and main memory 122 respectively, as shown in FIGS. 1C and 1D. Security awareness training server 202 may further include learning management system (LMS) 214. LMS 214 may be an application or a software that delivers and manages delivery of training content to users of the organization. In an example, the training content may include informative materials to provide security awareness training. The training content, for example, may include topics, chapters, lessons, courses, modules, and any other method of organizing content. In an implementation, LMS 214 may enable the organization to effectively train individual users and/or a group of users with respect to security awareness aspects and other training requirements using the training content. In one or more embodiments, LMS 214 may operate in collaboration with content resource 204 to receive training content from content resource 204 in order to provide the training content to the users.

In an implementation, LMS 214 may be managed by the system administrator. For example, the system administrator may upload training content and manage training content. LMS 214 may assign training content to users, evaluate understanding of the training content through tests and assessments, and track the performance of users. According to an implementation, LMS 214 may be configured to be SCORM-compliant such that LMS 214 can accept/recognize any content (for example, training content) that is SCORM-compliant, and deliver the SCORM-compliant content to users of LMS 214. SCORM is a technical specification that defines methodologies in creating and launching standardized training content. In an implementation, LMS 214 may be hosted as a stand-alone product on security awareness training server 202. In some implementations, LMS 214 may a cloud-based platform hosted by a third-party entity. In an implementation, LMS 214 is an extension to a conventional LMS. LMS 214 uses proprietary parameters to trigger tailoring and adaptation of the training content. Known examples of conventional LMS include Adobe® Captivate Prime and Docebo®.

Referring again to FIG. 2, in some embodiments, security awareness training server 202 may include risk score calculator 216. Risk score calculator 216 may be an application or a program for determining and maintaining risk scores for users in an organization. A risk score of a user may be a representation of the vulnerability of the user to a malicious attack. In an implementation, risk score calculator 216 may maintain more than one risk score for each user. Each risk score may represent vulnerability of the user for a specific cyberattack. In an implementation, risk score calculator 216 may calculate risk scores for a group of users, the organization, an industry to which the organization belongs, a geography, and any other population of users. In an example, the risk score of a user may be modified based on the user's responses to simulated phishing communications, completion of training by the user, a current position of the user in the organization, a size of a network of the user, an amount of time the user has held the current position in the organization, and/or any other attribute that can be associated with the user. Security awareness training server 202 utilizes risk scores of a user to determine a level of training required for the user. For example, if the risk score of a user is high indicating lack of required security awareness, the level of training required for the user is high. Similarly, if a risk score of a user is low indicating that the user has good levels of security awareness, the level of training required for the user is low. Accordingly, security awareness training server 202 may communicate risk scores and/or levels of training requirements of one or more users to LMS 214.

In some embodiments, security awareness training server 202 may include user data storage 218, risk score storage 220, and data model element storage 222. In an implementation, user data storage 218 may store information related to one or more users of an organization. For example, user data storage 218 may store information about the one or more users with respect to training content that is to be delivered/presented to the one or more users. In an example, user data storage 218 may store user data, corporate personal records, corporate address lists, and details of the organization's internal employee hierarchy or reporting structures. In some examples, user data storage 218 may also store personal information of the users. In an implementation, risk score storage 220 may store risk scores of users of an organization and data model element storage 222 may store one or more data model elements. A data model element may define or identify information about an organization or about one or more users of the organization. In an implementation, the one or more data model elements may be predefined in the SCORM standard. In some implementations, the one or more data model elements may be undefined or not formally defined by SCORM (or the SCORM standard) but supported by LMS 214. Examples of data model elements include a value of progress a user has made toward completing a training course, a name of a user, an amount of time a user is allowed to complete a training course, risk score, contact details for a Human Resources (HR) department or other departments of the organization, the organization's logo, theme information including logos, images, and color schemes, and any other information associated with the user and an organization of the user. The information related to the one or more users of the organization stored in user data storage 218, the risk scores of the users stored in risk score storage 220 and the data model elements stored in data model element storage 222 may be periodically or dynamically updated as required.

According to an embodiment, content resource 204 may include training content that includes teaching, learning, and research resources that may be shared across various systems and platforms. In an example, the training content may include full courses, course materials, modules, textbooks, streaming videos, tests, and any other materials. In an implementation, content resource 204 may include training content in shareable content objects (SCOs) 224-(1-N). In an example implementation, collection of shareable content objects (SCOs) 224-(1-N) may be referred to as a SCORM package. In an implementation, the SCORM package may be a folder of files that includes everything needed to deliver content to users of the organization and is ready for uploading to LMS 214.

In an implementation, SCO 224 may be a launchable learning object (resource) that may be used for learning, education, or training purposes. Further, SCO 224 may be a reusable learning object that may be used in multiple contexts for multiple purposes. In an example implementation, SCO 224 may be a self-contained unit and may not include any reference or link to other SCOs. In some implementation, though SCO 224 may be a self-contained unit, SCO 224 may include some reference or link to other SCOs for further training. In some examples, SCO 224 may be a unit of training content that can be shared across multiple SCORM-compliant learning platforms and systems. In an example implementation, SCORM defines how to create SCO 224 such that SCO 224 can be reused in different systems and contexts. In other words, SCORM is a specification for standardizing the reusability and interoperability of training content. In an implementation, the training content may be SCORM-compliant content. In an example implementation, SCORM-compliant content refers to content that is created and launched using specifications and standards defined by SCORM. In an example, the training content may be web-based content, eLearning content, or any other form of electronic content. For example, SCO 224 may be a topic, a chapter, a lesson, a course, or other any method of organizing content.

In an implementation, content resource 204 (or a component therein, such as SCO 224) may communicate with LMS 214 using a SCORM Run-Time Environment (RTE). Although, content resource 204 is shown to be outside security awareness training server 202, in some embodiments, content resource 204 may be uploaded into LMS 214 or security awareness training server 202 and is launched when one or more users decides to view training content. In an example, LMS 214 may initiate SCO 224 to present the training content to one or more users.

According to some embodiments, user device 206 may be any device used by a user. The user may be an employee of an organization or any entity. User device 206 as disclosed may be any computing device, such as a desktop computer, a laptop, a tablet computer, a mobile device, a Personal Digital Assistant (PDA) or any other computing device. In an implementation, user device 206 may be a device, such as client device 102 shown in FIGS. 1A and 1B. User device 206 may be implemented by a device, such as computing device 100 shown in FIGS. 1C and 1D.

In some embodiments, user device 206 may include processor 226 and memory 228. In an example, processor 226 and memory 228 of user device 206 may be CPU 121 and main memory 122, respectively, as shown in FIGS. 1C and 1D. User device 206 may also include user interface 230 such as a keyboard, a mouse, a touch screen, a haptic sensor, voice-based input unit, or any other appropriate user interface. It shall be appreciated that such components of user device 206 may correspond to similar components of computing device 100 in FIGS. 1C and 1D, such as keyboard 126, pointing device 127, I/O devices 130*a-n* and display devices 124*a-n*. User device 206 may also include display 232, such as a screen, a monitor connected to the device in any manner, or any other appropriate display. In an implementation, user device 206 may display received content for the user using display 232.

Referring again to FIG. 2, in some embodiments, user device 206 may include email client 234. In an implementation, email client 234 may be an application installed on user device 206. In some implementations, email client 234 may be an application that can be accessed over network 208 through a browser without requiring any installation on user device 206. In an implementation, email client 234 may be any application capable of composing, sending, receiving, and reading emails. For example, email client 234 may be an instance of an application, such as Microsoft Outlook™ application, Lotus Notes® application, Apple Mail® application, Gmail® application, or any other known or custom email application. In an example, a user of user device 206 may select, purchase and/or download email client 234, through for example, an application distribution platform. The term "application" may refer to one or more applications, services, routines, or other executable logic or instructions. According to some embodiments, user device 206 may include web browser 236. In an implementation, web browser 236 may be an application or a program for fetching information resources from the Internet and display them on user device 206. Known examples of web browser 236 include Google Chrome® and Mozilla Firefox™. In an implementation, LMS 214 may provide notifications associated with training through an email, via a desktop and/or browser. For example, LMS 214 may provide a notification associated with training to a user of user device 206 through email client 234 via web browser 236. In some implementations, LMS 214 may provide training through a browser, a multimedia application player provided by an operating system or through a proprietary SCORM-compliant multimedia application.

In operation, one or more users of an organization may be assigned training assignments as part of a security awareness training program. The training assignments may be a periodic training assignment or a dynamic campaign-based training assignment. When one or more users of an organization access training content for training assignments from LMS 214 as a part of the security awareness training program, LMS 214 and SCO 224 may interact with each other to deliver the training content to the one or more users. In one example, the training content may be formally assigned to the one or more users as a part of the security awareness training program for the users. In some examples, the training content may be assigned to the one or more users dynamically in response to the users interacting with a simulated phishing communication. The training content provided in response to the one or more users interacting with the simulated phishing communication may be relevant to a phishing exploit included in the simulated phishing communication. In an implementation, LMS 214 may initiate or launch SCO 224 to provide the training content to the one or more users. In an example, each user of the organization may gain access to LMS 214 using login credentials including a username and a password. In an example, the system administrator may generate a username and a password for each user. In some examples, each user may generate a password using self-email-based registration. In an implementation, the user of user device 206 may access LMS 214 using web browser 236. In some examples, LMS 214 may provide access to users of the organization through single sign-on, IP based authentication, or through means not requiring a user to use any credentials for logging-in to LMS 214.

In an embodiment, LMS 214 may implement an instance of an application programming interface (API) to be called by SCO 224 during runtime. The API may be a set of definitions, protocols, tools, and/or rules that allow SCO 224 to communication with LMS 214. In an implementation, the API may be a JavaScript object that LMS 214 provides for SCO 224 to interface with. According to an implementation, the API may include a plurality of functions that SCO 224 may use to communicate with LMS 214. In an example, the API may include eight functions: namely, an Initialize function, a Terminate function, a GetValue function, a SetValue function, a Commit function, a GetLastError function, a GetErrorString function, and a GetDiagnostic function.

In an implementation, when SCO 224 has found the API instance, SCO 224 may make multiple calls to LMS 214 during runtime to exchange information. In an example, SCO 224 may call (interchangeably referred to as an API call) one or more functions of the plurality of functions of the API to access and retrieve data model elements stored in data model element storage 222. The data model elements may define information being tracked for SCO 224, such as completion status of the training content or a score from an assessment such as a quiz or a test. In an example, the data model elements may be defined by the SCORM standard. The data model elements may have values that show circumstances that SCO 224 is being launched in LMS 214. Examples of the data model elements include a value of progress a user has made toward completing SCO 224 (i.e., the training content), whether a user gets credit for completion of SCO 224, the name of a user, the amount of time a user is allowed to complete SCO 224, which training modules a user has completed, contact details for the Human Resources (HR) department or other departments of the organization, the organization's logo, theme information including logos, images, and color schemes, and any other information. In an example, a user who accesses the training content from LMS 214 may be referred to as learner. An example listing of data model elements defined by SCORM standard (as Table 4.2a: SCORM Run-Time Environment Data Model Elements Summary) is provided in Table 1.

TABLE 1

Listing of data model elements from SCORM 2004, 4th Edition

| Data Model Element | Dot-Notation | Binding Description |
|---|---|---|
| Comments From Learner | cmi.comments_from_learner | Includes text from a learner |
| Comments From LMS | cmi.comments_from_lms | Includes comments and annotations intended to be made available to a learner |
| Completion Status | cmi.completion_status | Indicates whether a learner has completed a SCO |
| Completion Threshold | cmi.completion_threshold | Identifies a value against which the measure of the progress a learner has made toward completing a SCO can be compared to determine whether the SCO should be considered completed |
| Credit | cmi.credit | Indicates whether a learner will be credited for performance in a SCO |
| Entry | cmi.entry | Includes information that asserts whether a learner has previously accessed a SCO |
| Exit | cmi.exit | Indicates how or why a learner left a SCO |
| Interactions | cmi.interactions | Defines information pertaining to an interaction for the purpose of measurement or assessment |
| Launch Data | cmi.launch_data | Provides data specific to a SCO that the SCO can use for initialization |
| Learner Id | cmi.learner_id | Identifies a learner on behalf of whom a SCO instance was launched |
| Learner Name | cmi.learner_name | Represents the name of a learner |
| Learner Preference | cmi.learner_preference | Specifies learner preferences associated with the learner's use of a SCO |
| Location | cmi.location | Represents a location in a SCO |
| Maximum Time Allowed | cmi.max_time_allowed | Indicates the amount of accumulated time the learner is allowed to use a SCO in the learner attempt |
| Mode | cmi.mode | Identifies the modes in which a SCO may be presented to the learner |

TABLE 1-continued

Listing of data model elements from SCORM 2004, 4th Edition

| Data Model Element | Dot-Notation | Binding Description |
|---|---|---|
| Objectives | cmi.objectives | Specifies learning or performance objectives associated with a SCO |
| Progress Measure | cmi.progress_measure | Identifies a measure of the progress the learner has made toward completing a SCO |
| Scaled Passing Score | cmi.scaled_passing_score | Identifies a scaled passing score for a SCO |
| Score | cmi.score | Identifies a learner's score for a SCO |
| Session Time | cmi.session_time | Identifies the amount of time that a learner has spent in the current learner session for a SCO |
| Success Status | cmi.success_status | Indicates whether a learner has mastered a SCO |
| Suspend Data | cmi.suspend_data | Provides information that may be created by a SCO as a result of a learner accessing or interacting with the SCO |
| Time Limit Action | cmi.time_limit_action | Indicates what a SCO should do when the maximum time allowed is exceeded. |
| Total Time | cmi.total time | Identifies the sum of all of the learner's learner session times accumulated in the current learner attempt prior to the current learner session. |

In an example, some of the data model elements stored in data model element storage 222 may be undefined by SCORM (or the SCORM standard) but are supported by LMS 214. According to an implementation, LMS 214 may receive a call to a function of the plurality of functions of the API from SCO 224 to access information about the one or more users. In an example implementation, LMS 214 may receive the call to the function including the GetValue function (GetValue(parameter) function). The GetValue function may permit SCO 224 to request data model elements from LMS 214. In an implementation, the call to the GetValue function may reference a name of a data model element in LMS 214. The data model element may identify information about the one or more users. When the call is made, LMS 214 may return a character string of the value. In an example, in the event that an error occurs, the API may set an error code. The GetValue function as provided in clause 3.1.4.1 of the SCORM RTE is described in detail below.

GetValue

Method Syntax: return_value = GetValue(parameter)
Description: The function requests information from an LMS. It permits the SCO to request information from the LMS to determine among other things:
  Values for data model elements supported by the LMS.
  Version of the data model supported by the LMS.
  Whether or not specific data model elements are supported.
Parameter: The parameter represents the complete identification of a data model element.
Return Value: The method can return one of two values. The return value shall be represented as a characterstring.

-continued

GetValue

A characterstring containing the value associated with the parameter If an error occurs, then the API Instance shall set an error code to a value specific to the error and return an empty characterstring (""). The SCO may call GetLastError( ) to determine the type of error. More detailed information pertaining to the error may be provided by the LMS through the GetDiagnostic( ) function.

When a conventional LMS receives an API request in which a parameter is cmi.elementName (where elementName is some other parameter not defined in clause 4.2 of the SCORM RTE), then the conventional LMS may return an empty character string and set the error code to 401— Undefined Data Model Element. In an event that an error occurs, the API may set an error code and return an empty character string. Thus, in a scenario where the conventional LMS behaves according to SCORM standards, an API call made by a SCO to a conventional LMS with an elementName parameter that is not defined in the SCORM standard returns an empty character string. In other words, the conventional LMS returns an empty character string " " in response to the API request from the SCO and sets the error code to 401. A handling of a parameter included in the call to the GetValue function that is not recognized by the API instance is described below (as defined by clause 3.1.7.5.1 of the SCORM RTE):

Undefined Data Model Element (401)

The Undefined Data Model Element error condition indicates that:
  The data model element passed as the parameter in the GetValue(parameter) is undefined and not recognized by the API Instance. This condition indicates that an attempt was made to use a data model element that is not recognized by the API Instance.
  The data model element passed as parameter_1 in the SetValue(parameter_1, parameter_2) is undefined and not recognized by the API Instance. This condition indicates that an attempt was made to use a data model element that is not recognized by the API Instance.
An unrecognized or undefined data model element is any element that is not formally defined by the SCORM Run-Time Environment Data Model or an implementation defined extension element that is not recognized by the API Instance. The Undefined Data Model Element error code shall be used by an API Instance when one of the two scenarios described above is encountered. The API Instance shall:
  For a GetValue( ) request: set the error code to 401 and return an empty characterstring(""). This error condition can only happen if the conceptual communication state is "Running". If this error condition is encountered, the conceptual communication state shall remain unchanged ("Running").

As described above, in the event that an error occurs, the API may set an error code. In an example, the API may set the error code to 401. According to an embodiment, unlike the conventional LMS, LMS 214 may ignore the error code with respect to the data model element being undefined by SCORM and does not return an empty character string in an event of error. In an implementation, LMS 214 may include a code (in addition to regular codes of the conventional LMS) that enables LMS 214 to ignore the error code and render the information/content in its unmodified form to SCO 224 when the undefined parameter is requested. In an example, proprietary elementName parameters may be used to trigger the tailoring and adaptation of the training content by LMS 214. An example code excerpt is provided below.

```
function GetValue(data_model_element) {
  if data_model_element == 'abc.theme'
    return THEME
  else // regular SCORM GetValue implementation
}
```

In an example, LMS 214 may receive the call to the GetValue function requesting theme information for the one or more users. In an example, the theme information may include information such as logos, images, a color, a color scheme, additional sections of training content, and/or sections of text within the training content such as a heading or a body of text. In an example, the 'abc.theme' shown in the example code excerpt is a custom parameter passed to the GetValue function that identifies the data model element that may return a theme. In examples, 'abc.theme' could be any string of characters not defined by the SCORM standard as SCORM Run-Time Environment Data Model Elements.

In an example implementation, when undefined parameter "abc.theme" is requested, LMS 214 may return the theme information rather than an error code for the data model element using the example code excerpt provided above. In an implementation, LMS 214 may provide the theme information to use to tailor the training content to the one or more users in a serialized format such as JavaScript Object Notation (JSON), Hypertext Preprocessor (PHP), SOAP, Extensible Markup Language (XML), or any other serialized format. In an example, when LMS 214 receives a request for theme information, LMS 214 may send the theme information to SCO 224 in a serialized format to be rendered for training. For example, the theme information may include a purple color scheme as a part of the theme information. In an implementation, upon receiving the theme information, SCO 224 may be configured to apply the purple color scheme theme information to a training page, a navigation pane, interactive buttons, or any portion of the training content. In an example, SCO 224 may also apply the theme information to the training page with a custom title, text, and logos. In an implementation, a plurality of themes may be stored in LMS 214. Each theme may be different or customizable. In some implementations, the theme information may be provided to LMS 214 by the system administrator. The system administrator may use a configuration platform for LMS 214 to provide the theme information such as logos or images, a color or color scheme, additional sections of training content, or change sections of text within the training content such as a heading or a body of text. In an example, there may be options on the configuration platform to add or remove sections of training content such as texts, pages, videos, sections of videos, links, images or other content from the training content.

In some examples, LMS 214 may receive the call to the GetValue function requesting information about progress of training through the training content for the one or more users. In response to the call, LMS 214 may provide information about the one or more users identified by the data model element to SCO 224. In an implementation, LMS 214 may provide information about which modules of the training content the one or more users has previously taken to enable SCO 224 to remove corresponding portions of the training content when rendering the training content to the one or more users.

According to some embodiments, in response to receiving the information about the one or more users identified by the data model element, SCO 224 may be configured to tailor the training content to the one or more users based at least on the information. In an example, when LMS 214 receives a request for theme information, LMS 214 may send the theme information to be rendered for training. In an implementation, SCO 224 may be configured to apply the theme information in rendering the training content for the one or more users. In an example, the way the training content appears in a browser window of LMS 214 changes as a result of the theme information being requested by SCO 224 from LMS 214.

In an example, SCO 224 may tailor the training content at runtime to make it more relevant to a specific user or a group of users. Examples of such content tailoring include adding logos, adjusting the palette of the presentation to align with an organization's branding (or other local norms), tailoring for users in a specific department, tailoring for an affiliate or other organizational entity, removing a section of content that a user has viewed recently during another training session, removing a section of content that a user has completed, modifying a test or a quiz on the training to be relevant to the user or the group of users in terms of the language it is presented in, modifying according to seniority of role and job function of the user or the group of users, and including localized information, such as the contact details for local HR or other departments relevant to the training content.

In some situations, training modules may have some content in common. In an implementation, LMS 214 may store data about a user such as information about training modules that the user has undertaken recently. SCO 224 may retrieve this information using the GetValue function. According to an embodiment, the training modules may be adapted or modified to remove the content in common between training modules if the user has recently undertaken a training module including that content.

Figure 3:
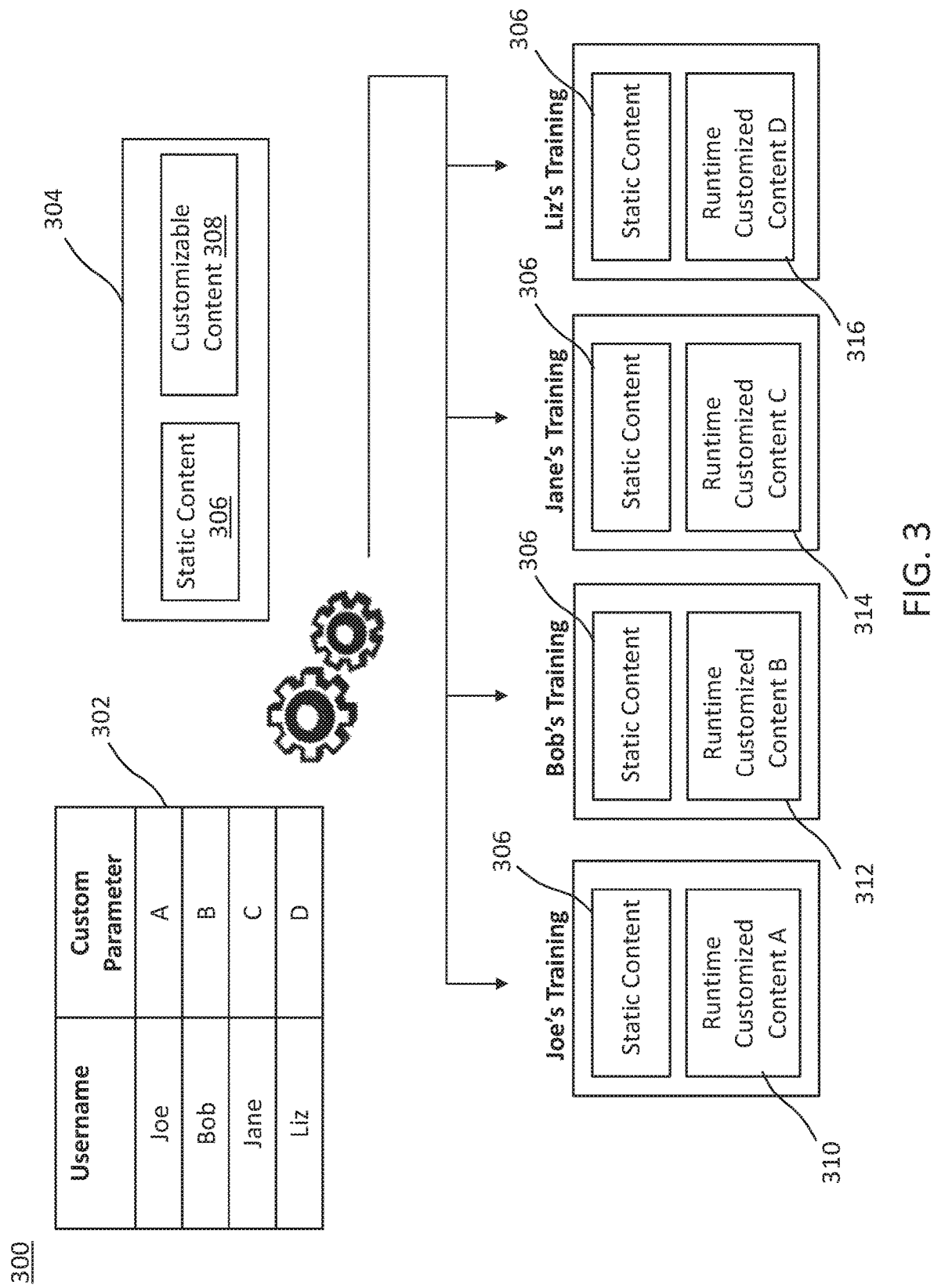
FIG. 3 is an illustration of tailoring of SCORM-compliant content for users of an organization, according to some embodiments.

FIG. 3 is an illustration 300 of tailoring SCORM-compliant content for users of an organization, according to some embodiments.

In the example of FIG. 3, table 302 provides names of users (or employees) of an organization to whom security awareness training content 304 is to be delivered and a custom parameter for each user. A custom parameter for a user may include information associated with the user that may be used to make security awareness training more relevant to that user. In an example, one or more custom parameters for a user may include one or more of the following—name of the user, job title of the user, job department of the user, job function of the user, name of an organization of the user, organizational logo, contact details of the user, language spoken by the user, contact details of Human Resources (HR) department or other departments of the organization, and other information that may serve as a custom parameter. In an example, security awareness training content 304 may be SCORM-compliant content. Security awareness training content 304 that is to be delivered or provided to users may include static content 306 and customizable content 308. Static content 306 may refer to any content that is to be delivered to an end user without having to be generated, modified, or processed by the security awareness system. For example, the static content 306 may be text, audio, a video, and/or any multimedia. Customizable content 308 may refer to any content that changes based on custom parameters of the users.

As can be seen in table 302, security awareness training content 304 is to be delivered to "Joe", "Bob", "Jane", and "Liz". Further, a custom parameter for "Joe" is "A", a custom parameter for "Bob" is "B", a custom parameter for "Jane" is "C", and a custom parameter for "Liz" is "D". In an example, the custom parameter "A" may be indicative of a job function of "Joe", the custom parameter "B" may be indicative of information of a training module that "Bob" had undertaken recently. In an example, "Bob" may have undertaken the training partially due to various reasons. In examples, "Bob" may not have been able to complete the training module due to requirements of imminent high priority project delivery. The custom parameter "C" may be indicative information of a training module that may be a part of mandatory training requirement that is to be provided periodically such as quarterly or half-yearly which is related to the role function of "Jane". The custom parameter "D" may be indicative of information of a training module that is to be presented or provided in response to an interaction with a simulated phishing communication including a phishing exploit by "Liz".

In an example, when "Joe" accesses security awareness training content 304 from LMS 214 as a part of a security awareness training program, LMS 214 and SCO 224 may interact with each other to tailor security awareness training content 304 at runtime to make security awareness training content 304 more relevant to "Joe". For example, "Joe" may be provided with static content 306 and runtime customized content A 310. In an example, LMS 214 may provide custom parameter "A" to SCO 224. SCO 224 may be configured to tailor customizable content 308 based on custom parameter "A" and generate runtime customized content A 310 for "Joe". For example, customizable content 308 may be tailored according to the job function of "Joe".

Similarly, when "Bob" accesses security awareness training content 304 from LMS 214 as a part of a security awareness training program, LMS 214 and SCO 224 may interact with each other to tailor security awareness training content 304 at runtime to make security awareness training content 304 more relevant to "Bob". For example, "Bob" may be provided with static content 306 and runtime customized content B 312. In an example, LMS 214 may provide custom parameter "B" to SCO 224. SCO 224 may be configured to tailor customizable content 308 based on custom parameter "B" and generate runtime customized content B 312 for "Bob". For example, runtime customized content B 312 may be a continuation of the training module from a point where "Bob" had stopped in a previous session. In an example, if "Bob" had completed forty percent (40%) of the training module in the previous session, then runtime customized content B 312 (a current session) may include remaining 60 percent of the training module, thus allowing continued training that was stopped in the previous session. In an example, "Bob" may still be given an option to start the training module from the beginning or any other point in the training.

In a similar manner, when "Jane" accesses security awareness training content 304 from LMS 214 as a part of a security awareness training program, LMS 214 and SCO 224 may interact with each other to tailor security awareness training content 304 at runtime to make security awareness training content 304 more relevant to "Jane". For example, "Jane" may be provided with static content 306 and runtime customized content C 314. In an example, LMS 214 may provide custom parameter "C" to SCO 224. SCO 224 may be configured to tailor customizable content 308 based on custom parameter "C" and generate runtime customized content C 314 for "Jane". For example, runtime customized content C 314 may include the training module that is to be provided half-yearly tailored according to the job function of "Jane".

In an example, when "Liz" accesses security awareness training content 304 from LMS 214 as a part of a security awareness training program, LMS 214 and SCO 224 may interact with each other to tailor security awareness training content 304 at runtime to make security awareness training content 304 more relevant to "Liz". For example, "Liz" may be provided with static content 306 and runtime customized content D 316. In an example, LMS 214 may provide custom parameter "D" to SCO 224. SCO 224 may be configured to tailor customizable content 308 based on custom parameter "D" and generate runtime customized content D 316 for "Liz". For example, runtime customized content D 316 may include the training module that may be relevant to the phishing exploit included in the simulated phishing communication. The phishing exploit may be a simulated phishing link. In an example, "Liz" may have received the simulated phishing communication in a form of an email in her mailbox. When "Liz" clicks on the simulated phishing link, "Liz" may be provided with runtime customized content D 316.

FIG. 4 shows an illustration 400 of SCORM-compliant content that is to be tailored for one or more users of an organization, according to some embodiments.

In the example of FIG. 4, the security awareness training content may be tailored to make the security awareness training content more relevant to one or more users of an organization. As can be seen in FIG. 4, the security awareness training content may be tailored to include organization logo 402, customizable text 404, username 406, and email ID 408. In an example, organization logo 402, customizable text 404, username 406, and email ID 408 may be stored in security awareness training server 202. In an example, in response to API calls, LMS 214 may provide organization logo 402, customizable text 404, username 406, and email ID 408 to SCO 224 based on which SCO 224 may be configured to tailor the security awareness training content for the one or more users.

Figure 5:
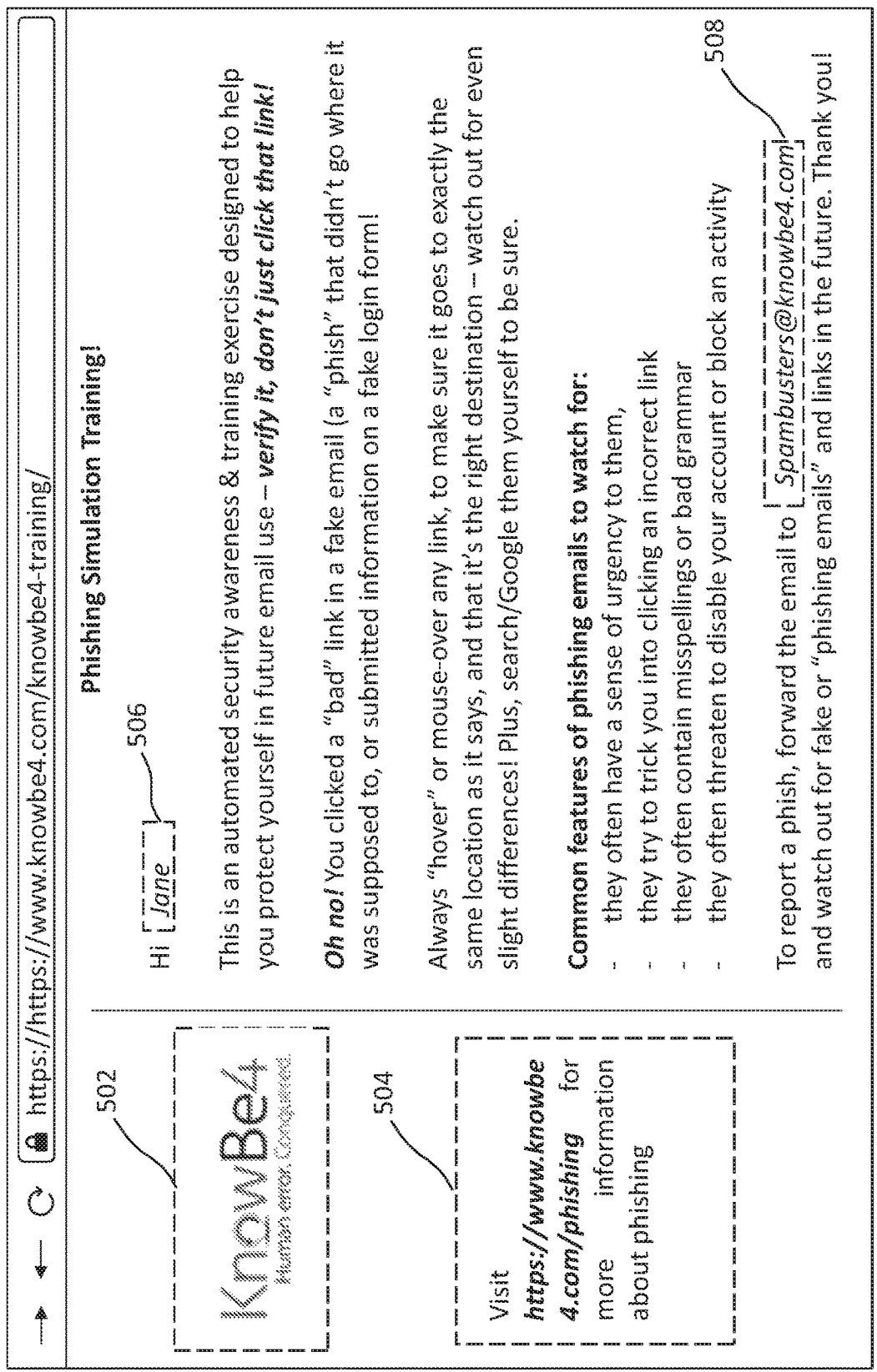
FIG. 5 shows an illustration of tailored SCORM-compliant content for a user of an organization, according to some embodiments.

FIG. 5 shows an illustration 500 of tailored SCORM-compliant content for a user of an organization, according to some embodiments.

In an example, when a user of an organization accesses security awareness training content from LMS 214 as a part of a security awareness training program, LMS 214 and SCO 224 may interact with each other to deliver the security awareness training content to the user. In an implementation, LMS 214 may initiate or launch SCO 224 to provide the security awareness training content to the user. In an embodiment, LMS 214 may implement an instance of an API to be called by SCO 224 during runtime. In an example, the API may include a plurality of functions. In an implementation, when SCO 224 has found the API instance, SCO 224 may make multiple calls to LMS 214 during runtime to exchange information. In an example, SCO 224 may call the API to access/retrieve data model elements stored in data model element storage 222. Examples of the data model elements include information related to an organization's logo, customizable text, the name of the user, and the email ID (or email address) of the IT (Information Technology) department.

According to an implementation, LMS 214 may receive calls to a function of the plurality of functions of the API from SCO 224 requesting information related to the organization's logo, the customizable text, the name of the user, and the email ID of the IT department. In response, LMS 214 may provide the information related to the organization's logo, the customizable text, the name of the user, and the email ID of the IT department to SCO 224 to use to tailor the security awareness training content. In the example of FIG. 5, SCO 224 may tailor the security awareness training content to include organization logo 502 of the organization "KnowBe4", customizable text 504 including "Visit https://www.knowbe4.com/phishing for more information about phishing", username 506 including "Jane", and email ID 508 including "Spambusters@knowbe4.com".

Figure 6:
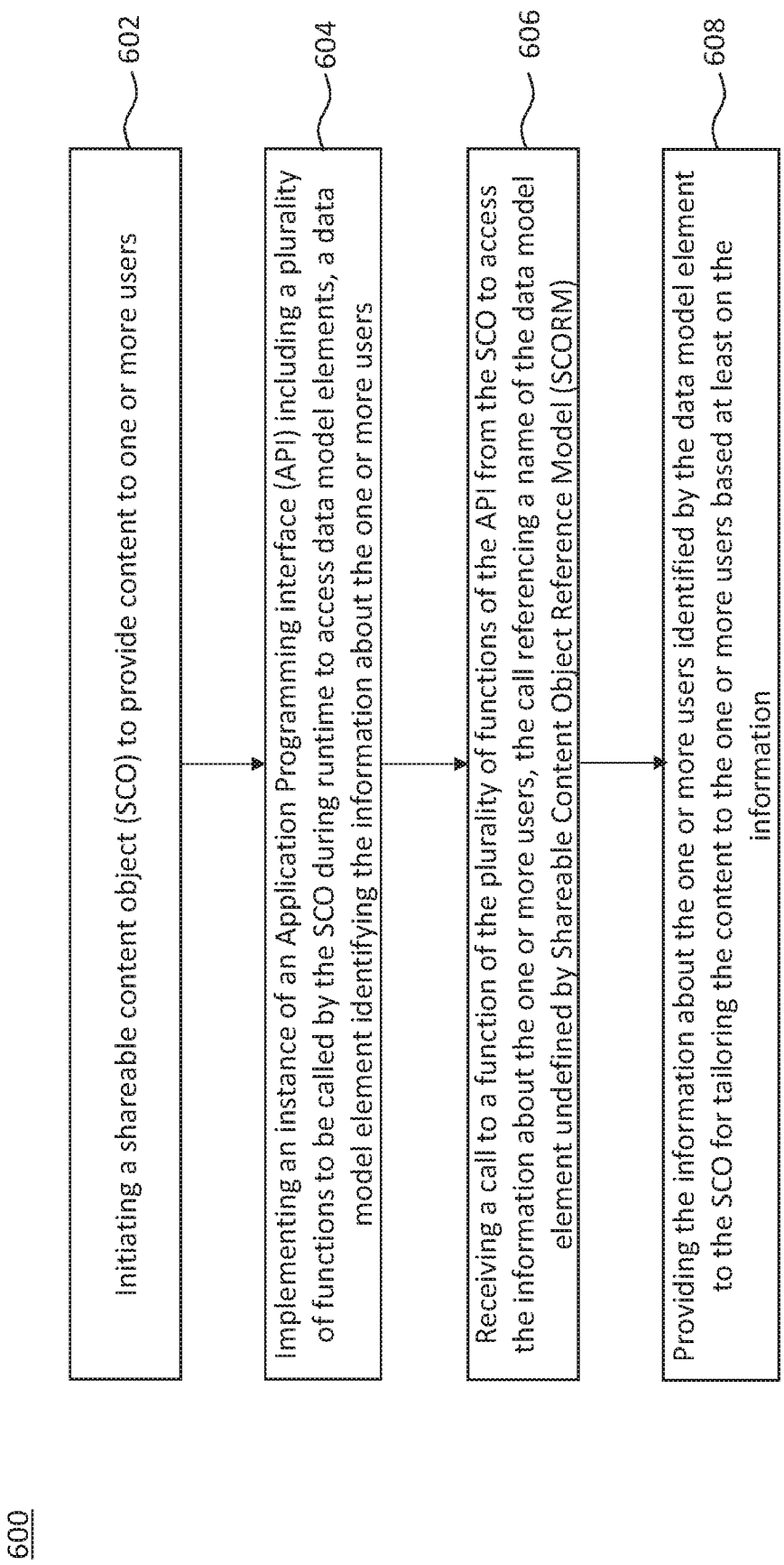
FIG. 6 depicts a flow chart for tailoring SCORM-compliant content for one or more users of an organization, according to some embodiments.

FIG. 6 depicts a flow chart 600 for tailoring SCORM-compliant content for one or more users of an organization, according to some embodiments.

Step 602 includes initiating an SCO to provide content to one or more users. According to an implementation, SCORM-compliant LMS 214 may be configured to initiate SCO 224 to provide content to one or more users. In an example, LMS 214 may be configured to store data about the one or more users with respect to the content.

Step 604 includes implementing an instance of an application programming interface (API) including a plurality of functions to be called by the SCO during runtime to access data model elements. A data model element identifies information about the one or more users. In an implementation, LMS 214 may implement an instance of the API including the plurality of functions to be called by SCO 224 during runtime to access the data model elements accessible via LMS 214. In an example implementation, LMS 214 may be configured to support one or more data model elements undefined by SCORM.

Step 606 includes receiving a call to a function of the plurality of functions of the API from the SCO to access the information about the one or more users, the call referencing a name of the data model element undefined by SCORM. In an implementation, LMS 214 may receive the call to the function of the plurality of functions of the API from SCO 224 to access information about the one or more users. In an example, the data model element identifies the information about the one or more users. In an implementation, LMS 214 may receive a call to a function including a GetValue function with a parameter passed to the GetValue function that identifies the data model element undefined by SCORM but supported by LMS 214. In an example, LMS 214 may receive the call to the function requesting theme information for the one or more users. The theme information may include information such as logos, images, a color, a color scheme, additional sections of training content, and/or sections of text within the training content such as a heading or a body of text. In some examples, LMS 214 may receive the call to the function requesting information about progress of training via the content for the one or more users.

Step 608 includes providing the information about the one or more users identified by the data model element to the SCO for tailoring the content to the one or more users based at least on the information. In an implementation, LMS 214 may ignore an error code with respect to the data model element being undefined by SCORM and provide the information about the one or more users in response to the call. In an example, LMS 214 may provide the information in a serialized format. In an implementation, LMS 214 may provide the information (content) unmodified to SCO 224. In an example, the information about the one or more users identified by the data model element is provided to SCO 224. SCO 224 may be configured to tailor content to the one or more users based at least on the information. In an example, in response to the requested theme information for the one or more users, LMS 214 may provide the theme information to SCO 224 to use to tailor the content to the one or more users. SCO 224 may be configured to apply the theme information in rendering the content for the one or more users. In some examples, LMS 214 may provide information about which modules of content for training one or more users has taken to enable SCO 224 to remove corresponding portions of the content when rendering the content to the one or more users.

Although the above embodiments are described with respect to security awareness training, the embodiments can be applied to other training programs such as software training, soft skills training, finance course training, and any other kind of training. In other words, the above embodiments can be used for customizing training for users based on various aspects in a SCORM-compliant LMS. The SCORM-compliant LMS as described herein in various embodiments resolves an issue of rigidity in terms of customization that is present in a conventional LMS. The SCORM-compliant LMS herein in various embodiments enables customization through various embodiments described herein. With customizations, the user can be presented with content that is relevant and customized to the user's training requirements.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for tailoring shareable content object reference model (SCORM)-compliant content to one or more users, the method comprising:
   initiating, by a learning management system (LMS) configured to be shareable content object reference model (SCORM)-compliant, a shareable content object (SCO) to provide content to one or more users, the LMS configured to store data about the one or more users with respect to the content;
   implementing, by the LMS, an instance of an application programming interface (API) comprising a plurality of functions to be called by the SCO during runtime to access data model elements accessible via the LMS, wherein the LMS is configured to support one or more data model elements undefined by SCORM;
   receiving, by the LMS, a call to a function of the plurality of functions of the API from the SCO to access information about the one or more users, the call referencing a name of one of the one or more data model elements undefined by SCORM, the data model element identifying the information about the one or more users; and
   providing, by the LMS in response to the call, information about the one or more users identified by the data model element to the SCO, the SCO configured to tailor the content to the one or more users based at least on the information.

2. The method of claim 1, further comprising providing, by the LMS, the content unmodified to the SCO.

3. The method of claim 1, further comprising ignoring, by the LMS, an error code with respect to the data model element being undefined by SCORM.

4. The method of claim 1, further comprising receiving the call to the function comprising a GetValue function with a parameter passed to the GetValue function that identifies the data model element undefined by SCORM but supported by the LMS.

5. The method of claim 1, further comprising receiving the call to the function requesting theme information for the one or more users.

6. The method of claim 5, further comprising providing, by the LMS, the theme information to use to tailor the content to the one or more users.

7. The method of claim 5, wherein the SCO is configured to apply the theme information in rendering the content for the one or more users.

8. The method of claim 1, further comprising providing by the LMS, the information in a serialized format.

9. The method of claim 1, further comprising receiving the call to the function requesting information about progress of training via the content for the one or more users.

10. The method of claim 9, further comprising providing, by the LMS, information about which modules of the content for training the one or more users has taken to enable the SCO to remove corresponding portions of the content when rendering the content to the one or more users.

11. A system for tailoring shareable content object reference model (SCORM)-compliant content to one or more users, the system comprising:
  a learning management system (LMS) configured on one or more processors, coupled to a memory and configured to be shareable content object reference model (SCORM)-compliant, wherein the LMS is configured to store data about the one or more users with respect to the content and to support one or more data model elements undefined by SCORM;
  wherein the LMS on the one or more processors is configured to:
    initiate a shareable content object (SCO) to provide content to one or more users, the LMS configured to store data about the one or more users with respect to the content;
    implement an instance of an application programming interface (API) comprising a plurality of functions to be called by the SCO during runtime to access data model elements accessible via the LMS;
    receiving a call to a function of the plurality of functions of the API from the SCO to access information about the one or more users, wherein the call references a name of one of the one or more data model elements undefined by SCORM and the data model element identifies the information about the one or more users; and
    wherein the LMS, in response to the call, provides the information about the one or more users identified by the data model element to the SCO, the SCO configured to tailor the content to the one or more users based at least on the information.

12. The system of claim 11, wherein the LMS is configured to provide the content unmodified to the SCO.

13. The system of claim 11, wherein the LMS is configured to ignore an error code with respect to the data model element being undefined by SCORM.

14. The system of claim 11, wherein the LMS is configured to receive the call to the function comprising a GetValue function with a parameter passed to the GetValue function that identifies the data model element undefined by SCORM but supported by the LMS.

15. The system of claim 11, wherein the LMS is configured to receive the call to the function requesting theme information for the one or more users.

16. The system of claim 15, wherein the LMS is configured to provide the theme information to use to tailor the content to the one or more users.

17. The system of claim 15, wherein the SCO is configured to apply the theme information in rendering the content for the one or more users.

18. The system of claim 11, wherein the LMS is configured to provide the information in a serialized format.

19. The system of claim 11 wherein the LMS is configured to receive the call to the function requesting information about progress of training via the content for the one or more users.

20. The system of claim 19, wherein the LMS is configured to provide information about which modules of the content for training the one or more users has taken to enable the SCO to remove corresponding portions of the content when rendering the content to the one or more users.

* * * * *